(12) United States Patent
Havel

(10) Patent No.: US 9,255,520 B2
(45) Date of Patent: Feb. 9, 2016

(54) MODULAR ADSORPTION-ENHANCED COMPRESSED AIR ENERGY STORAGE SYSTEM WITH REGENERATIVE THERMAL ENERGY RECYCLING

(71) Applicant: Energy Compression Inc., Boston, MA (US)

(72) Inventor: Timothy F. Havel, Boston, MA (US)

(73) Assignee: Energy Compression Inc., Boston, MA (US)

( * ) Notice: Subject to any disclaimer, the term of this patent is extended or adjusted under 35 U.S.C. 154(b) by 424 days.

(21) Appl. No.: 13/779,195

(22) Filed: Feb. 27, 2013

(65) Prior Publication Data

US 2013/0219892 A1    Aug. 29, 2013

Related U.S. Application Data

(60) Provisional application No. 61/603,555, filed on Feb. 27, 2012.

(51) Int. Cl.
| | |
|---|---|
| *F01K 25/02* | (2006.01) |
| *F02C 1/04* | (2006.01) |
| *F02C 1/00* | (2006.01) |
| *F28D 17/00* | (2006.01) |
| *F02C 1/05* | (2006.01) |
| *F02C 6/16* | (2006.01) |
| *F28D 20/00* | (2006.01) |

(52) U.S. Cl.
CPC ... *F02C 1/00* (2013.01); *F02C 1/05* (2013.01); *F02C 6/16* (2013.01); *F28D 17/00* (2013.01); *F28D 17/005* (2013.01); *F28D 20/003* (2013.01); *Y02E 60/142* (2013.01); *Y02E 60/15* (2013.01)

(58) Field of Classification Search
None
See application file for complete search history.

(56) References Cited

U.S. PATENT DOCUMENTS

| 4,610,148 A | 9/1986 | Shelton |
| 4,637,218 A | 1/1987 | Tchernev |
| 4,801,308 A * | 1/1989 | Keefer ............... B01D 53/04 422/217 |
| 5,845,507 A | 12/1998 | Critoph et al. |
| 8,113,011 B2 | 2/2012 | Howes et al. |
| 2010/0257862 A1 | 10/2010 | Howes et al. |

(Continued)

OTHER PUBLICATIONS

Waples, Douglas W. et al., "A Review and Evaluation of Specific Heat Capacities of Rocks, Minerals, and Subsurface Fluids. Part 1: Minerals and Nonporous Rocks," Natural Resources Research, vol. 13(2):97-122 (2004).

*Primary Examiner* — Jesse Bogue
(74) *Attorney, Agent, or Firm* — Nelson Mullins Riley & Scarborough LLP; Anthony A. Laurentano

(57) ABSTRACT

A compressed air energy storage module including an integrated thermal energy storage and recovery apparatus is provided. The compressed air energy storage module contains no moving parts and is constructed onsite, underground and out-of-sight. The compressed air energy storage module comprises a first regenerative heat exchanger including a first tank filled with a first particulate material that stores thermal energy and adsorbs air, and a second regenerative heat exchanger including a second tank filled with a second particulate material that stores thermal energy. A first end of the first tank is connected to a first end of the second tank via a first piping system. A second end of the first tank is connected to a second end of the second tank via a second piping system. The first piping system and the second piping system form a circular path for the air to circulate through the first and second regenerative heat exchangers.

10 Claims, 10 Drawing Sheets

(56) References Cited

U.S. PATENT DOCUMENTS

| | | | |
|---|---|---|---|
| 2011/0023476 A1* | 2/2011 | Havel | F01K 3/00 60/407 |
| 2011/0094236 A1* | 4/2011 | Finkenrath | F02C 6/16 60/772 |
| 2011/0100010 A1* | 5/2011 | Freund | F02C 1/005 60/659 |
| 2011/0127004 A1* | 6/2011 | Freund | F02C 6/16 165/45 |
| 2012/0085087 A1* | 4/2012 | Canal | F02C 6/16 60/412 |

* cited by examiner

MODULAR ADSORPTION-ENHANCED COMPRESSED AIR ENERGY STORAGE SYSTEM WITH REGENERATIVE THERMAL ENERGY RECYCLING

CROSS REFERENCE TO RELATED APPLICATIONS

This patent application claims the benefit of U.S. Provisional Application No. 61/603,555 filed on Feb. 27, 2012, the contents of which is incorporated herein by reference in its entirety.

BACKGROUND

Compressed air energy storage (CAES) is a proven means of storing mechanical or, via an electric generator, electrical energy for subsequent use on a very large scale. Existing commercial CAES facilities store the compressed air in naturally occurring underground geological formations, and obtain the heat needed to fully recover the stored energy by burning natural gas. The former feature avoids the considerable cost of the pressure vessels that would otherwise be needed to confine the compressed air, but forces these CAES facilities to be located near to suitable geological formations. The latter feature allows the stored energy to be recovered efficiently and at an acceptably high power level, but adds to the cost of operating the facility and results in the emission of carbon dioxide, a persistent pollutant and greenhouse gas.

A number of approaches to making CAES economical without any net carbon emissions and/or less limiting site restrictions are under development. There are two ways to avoid the carbon emissions. The first is to take the heat needed to recover the stored energy upon expansion from a carbon-neutral source, for example the surrounding atmosphere or ground, solar thermal hot water, biomass or a waste stream. The second is to store the heat produced by compressing the air for reuse upon expanding it. These two forms of carbon-neutral CAES are not separated by a sharp line; for example the heat of compression may be stored in a water reservoir, and the heat lost during storage made up for using one of the aforementioned heat sources.

There are likewise two, not-necessarily exclusive, ways to avoid site restrictions of existing CAES facilities. The first is to reduce the cost of the pressure vessels by various means. The most widely applicable means is to use high pressures (typically of order 200 atmospheres). This reduces the amount of steel or other material required to store a given amount of energy as compressed air (logarithmically with pressure in the isothermal model), and hence the cost per unit of stored energy as well. The cost can also be lowered by using buried pipes in a remote or restricted area, in which case the overpressure safety factors required by ASME (American Society of Mechanical Engineers) regulations are much smaller than those for unburied tanks (1.4 instead of 3.5). Still another means of cutting the cost is to confine the air using a less expensive material than steel.

Unfortunately, inexpensive building materials such as concrete lack sufficient strength in tension, while modern high-tensile strength materials such as carbon-fiber resins still cost considerably more per unit strength. Viable alternatives include artificial underground chambers, which may be excavated in certain kinds of rock for a reasonable cost, or confining the air in fabric containers underwater at a depth where the hydrostatic pressure equals the desired operating pressure. These latter possibilities have their own site restrictions, although much less severe than those of suitable naturally occurring geological formations.

The second class of methods for confining the air without severe site restrictions is chemical rather than mechanical. One such approach is to store the air at ambient pressure but as a liquid at cryogenic temperatures (ca. −160° C.). Another is to adsorb the air in a nano-porous solid material such as a zeolite. The amount of air adsorbed may be controlled by adjusting the temperature of the material rather than the pressure over it, specifically by cooling it to make it adsorb air and heating it to desorb the air. With common zeolite materials such as 13X (NaX), the temperatures and pressures required for this Adsorption-Enhanced Compressed Air Energy Storage (AE-CAES) are quite mild, making this a particularly promising albeit still relatively undeveloped form of CAES.

The main challenge in designing a cost-effective AE-CAES system is that several times more heat must be moved around over the course of the storage cycle than in most other approaches to CAES. This includes the sensible heat in the adsorbent and the latent heat of adsorption, in addition to the heat of compression.

SUMMARY OF THE INVENTION

The present invention discloses how to integrate thermal energy storage and recovery directly into the same system components as those used for the storage of energy in the form of compressed and adsorbed air. The resulting module contains no moving parts and is constructed onsite, underground and out-of-sight. This has the advantage of greatly reducing the land area taken up by the facility, and in many cases one skilled in the art of geotechnical engineering will also be able make the surrounding soil contribute substantially to the confinement of the air, further lowing the cost. Furthermore, the module can be built using methods and components that are widely employed in the construction of buildings' foundations, water transport systems and similar underground infrastructure. Accordingly a great deal of cost optimization has already gone into them. The invention also shows explicitly how one can make up for losses in the thermal energy storage system using solar thermal panels in conjunction with an adsorption water chiller powered by this source of heat. The resulting system may be deployed cost effectively anywhere that real estate prices and the soil composition permit, and the underground components should last many decades without maintenance.

According to various embodiments, a compressed air energy storage module is provided. The compressed air energy storage module comprises a first regenerative heat exchanger including a first tank filled with a first particulate material that stores thermal energy and adsorbs air, and a second regenerative heat exchanger including a second tank filled with a second particulate material that stores thermal energy. A first end of the first tank is connected to a first end of the second tank via a first piping system. A second end of the first tank is connected to a second end of the second tank via a second piping system. The first piping system and the second piping system form a circular path for the air to circulate through the first and second regenerative heat exchangers.

Various embodiments provide a method for charging and discharging a compressed air energy storage system comprising at least one compressed air energy storage module. The at least one compressed air energy storage module includes a first regenerative heat exchanger including a first tank filled with a first particulate material that stores thermal energy and adsorbs air, a second regenerative heat exchanger including a second tank filled with an inert second particulate material that stores thermal energy. A first end of the first tank is connected to a first end of the second tank via a first piping system, a second end of the first tank is connected to a second end of the second tank via a second piping system. The first piping system and the second piping system form a circular path for the air to circulate through the first and second regenerative heat exchangers. The method comprises introducing air into the first piping system of the at least one compressed air energy storage module through an opening to charge the compressed air energy storage system. During charging process, the air flows toward the first end of the second tank, through the inert second particulate material in the second tank toward the second end of the second tank, through the second piping system toward the second end of the first tank, and through the first particulate material in the first tank. The method further comprises retrieving at least a portion of the air at the opening to discharge the compressed air energy storage system. During discharging process, the air flows through the first piping system toward the first end of the first tank, through the first particulate material in the first tank toward the second of the first tank, through the second piping system toward the second end of the second tank, and through the inert second particulate material in the second tank.

Embodiments provide a method for building a compressed air energy storage system comprising a plurality of compressed air energy storage modules. Each of the compressed air energy storage modules includes a first regenerative heat exchanger including a first tank filled with a first particulate material that stores thermal energy and adsorbs air, a second regenerative heat exchanger including a second tank filled with an inert second particulate material that stores thermal energy. A first end of the first tank is connected to a first end of the second tank via a first piping system, a second end of the first tank is connected to a second end of the second tank via a second piping system. The first piping system and the second piping system form a circular path for the air to circulate through the first and second regenerative heat exchangers. The method comprises creating a pair of vertical caissons in the ground and lining walls of the pair of vertical caissons with a a plurality of flow-inhibiting layers. The method also comprises connecting the pair of vertical caissons by a pair of lined tunnels. The method further includes connecting the plurality of compressed air energy storage modules to a central equipment facility.

DETAILED DESCRIPTION OF THE INVENTION

Figure 1:
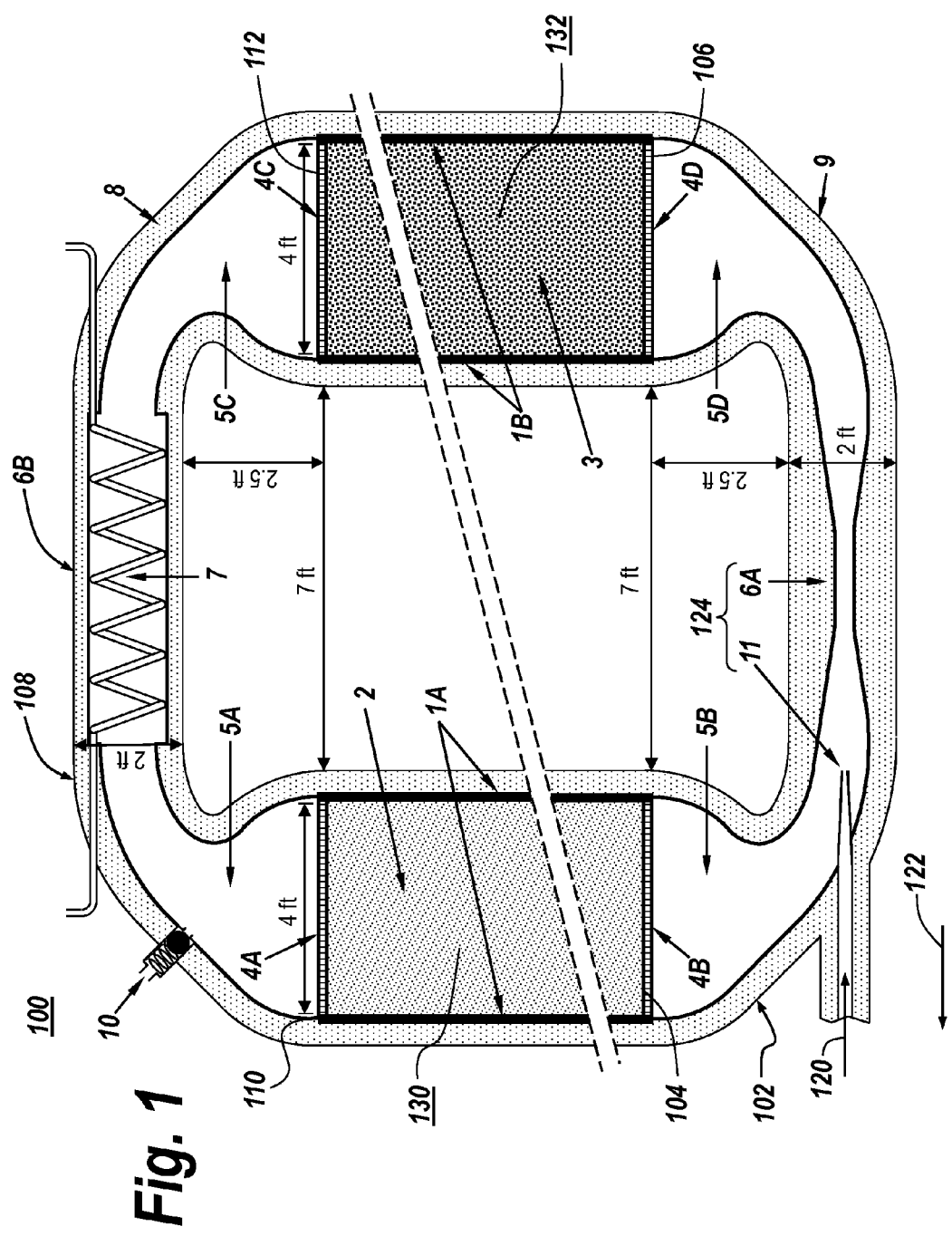
FIG. 1 is a drawing of a vertical cross-section of an air storage module in the preferred embodiment.

In the field of adsorption refrigeration and heat pumps, several approaches have been proposed which seek an improved coefficient of performance by causing a "thermal wave" or front to propagate through a packed or fused bed of a particulate adsorbent. Early examples of this approach, which achieved this effect by passing a heat transfer fluid such as a mineral oil through an embedded heat exchanger, may be found in "Solid Adsorbent Heat Pump System", U.S. Pat. No. 4,610,148 by S. V Shelton (1986), and "Heat Pump Energized by Low-Grade Heat Source", U.S. Pat. No. 4,637,218 by D. I. Tchernev (1987).

R. E. Critoph subsequently proposed using the adsorbate vapor itself as the heat transfer fluid, instead of a separate fluid passing through a heat exchanger in the adsorbent bed, thereby producing a "convective thermal wave". A similar process may also occur in a regenerative heat exchanger, and accordingly, Critoph's student R. Thorpe proposed to use a second packed or fused particulate bed, containing an inert material rather than an adsorbent, in the same fluid loop in order to store the heat taken from the adsorbent bed for reuse during the regeneration process. This process was set forth in "Thermal Compressive Device", U.S. Pat. No. 5,845,507 by R. E. Critoph & R. Thorpe (1998).

An adsorption heat pump may be viewed as a device which stores energy in the form of latent heat, said heat being produced or obtained from sources external to the device, for subsequent external use in generating cold or regenerating heat at a higher temperature. Like all adsorption heat pumps, the devices proposed by Critoph & Thorpe are closed systems which exchange no mass with their surroundings in the course of operation. Conventional gas-compression heat pumps which comprise an open system using air as the working fluid are also known, as in "Apparatus for Use as a Heat Pump", U.S. Pat. No. 8,113,011 by J. S. Howes & J. Macnaghten, but these do not employ any form of adsorption.

The present invention utilizes a packed or fused particulate bed of an adsorbent and a second packed or fused particulate bed of an inert material as a thermal regenerator in a single gas flow loop, for purpose of storing "high-grade" mechanical or electrical energy generated external to the device for subsequent external use. The present invention takes atmospheric air, pressurizes the atmospheric air, and stores the pressurized atmospheric air in the adsorbent by temperature-swing adsorption. The air in the system is also used as the working fluid to transfer cold to the adsorbent bed from the inert material bed. During this process the sensible heat in the adsorbent bed and the latent heat of adsorption, possibly along with the heat of compression, will similarly be carried by the air to the inert material bed. In order to release the stored energy, air is desorbed by reversing the temperature swing with the simultaneous recovery of said stored heat from the inert material, whereupon the compressed air is expanded thereby recovering the stored mechanical or, via an electric generator, electrical energy. During this process the sensible cold in the adsorbent and the additional cold produced by desorption is returned to the inert material. Such a device is open system which exchanges air with its surroundings over the course of each cycle. Although the system will also exchange some heat and cold with its surroundings, this is regarded as a "parasitic" load which is to be minimized as much as it is practical to do so.

The application of a packed-bed regenerator heated and cooled by air or some other gas for the purpose of storing mechanical or electrical energy may also be found in, for example, "Energy Storage", Pub. No. US 2010/0257862, by J. S. Howes & J.

Macnaghten (hereafter "the Howes reference"). In the Howes reference, the energy is stored in the form of a temperature difference between a regenerative heat exchanger and its surroundings, or between two regenerative heat exchangers, wherein said difference is produced by a gas-compression heat pump. Unlike the present invention, the Howes reference uses no adsorbent for the air or other gas, but instead stores its energy solely in the form of a temperature difference between two regenerators or between a regenerator and its surroundings. The stored mechanical or electrical energy is recovered by running the heat pump in reverse as a heat engine, which is driven by the flow of heat between the regenerator beds or their surroundings as they return to the equilibrium state wherein their temperatures are equal to that of their surroundings.

In contrast, the two packed or fused beds of the present invention exchange heat so that the hot one becomes cold and the cold one hot halfway through the storage cycle, and then return to their original nonequilibrium temperatures at the end of the cycle. This is done solely to drive the temperature-swing adsorption process by which the air and mechanical energy are stored and recovered in an economical fashion. Thus the absolute value of the temperature difference is maintained over multiple cycles to the maximum extent practical. In the proposed embodiment this is done with the help of a radiator or other heat exchanger contained in the same gas flow loop, as described below.

Another innovative aspect of the present invention is the use of certain kinds of commercially available water transport piping to confine the air more cost-effectively than steel tanks. The most common type of piping for transporting water over long distances is formed from prestressed concrete, wherein high-tensile-strength steel wires are wrapped around the concrete to keep it in compression even though the water that flows within it is under pressure. Both the cylindrical (containing a thin cylindrical steel core) and noncylindrical (with no steel core) pipes have been made over ten feet in diameter and able to withstand pressures exceeding twenty atmospheres, both of which are more than sufficient for AE-CAES. Prestressed concrete pipes are less expensive than steel or even cast iron pipes, can easily withstand the temperature variations of AE-CAES, and typically last for many decades. A more recent alternative is fiberglass composite pipes such as the FLOWTITE brand, which could at least be used for portions of an AE-CAES system that will not be heated much above 100° C.

Water transport pipes are typically installed underground, which is also convenient in the present case because the modest energy density of AE-CAES means that an installation might otherwise take up a considerable valuable real estate. Because desorption intrinsically takes a minute or more to occur, the air will never escape with dangerous force, so the land over a buried AE-CAES system could safely be used for almost any other purpose. Being underground will further enhance the safety of pipes and other components holding unadsorbed compressed air, keep the noise of operating the system from being audible, and help to dampen vibrations that could otherwise lead to leaks. Finally the surrounding soil, possibly after compaction, may help contain the compressed air itself by ensuring that the concrete pipes remain under compression.

The preferred embodiment of the AE-CAES system herein disclosed may be composed of a plurality of modules 100, the vertical cross-section of an instance of which is drawn in FIG. 1. Each module 100 may include a pair of regenerative heat exchangers 130 and 132 including, respectively, a first tank 1A and a second tank 1B. The first tank 1A and the second tank 1B may include, for example, prestressed concrete pipe sections.

Only the top and bottom portions of the regenerative heat exchangers 130 and 132 are shown, separated by a pair of diagonal dashed lines in the drawing, so as to make it fit on the page. The first tank 1A is filled with a zeolite particulate 2, while the second tank 1B is filled with an inert particulate 3 with a high heat capacity. Besides a zeolite mineral, first tank 1A may also be filled with a particulate composed of a mesoporous organosilicate, and/or a metal-organic framework. The particulates are held in place by screens or other gratings, 4A-4D, covering the ends of the tanks 1A, 1B and fastened to the inner walls of the tanks 1A, 1B. Both tanks 1A and 1B are vertically oriented to ensure that the particulates 2, 3 contained therein are pressed against the inner walls by gravity, leaving no open passageways by which the air might flow around rather than through the particulates 2, 3.

Steel fittings 5A-5D are attached in an airtight fashion to the four ends of the two tanks 1A, 1B. Steel fittings 5A-5D are formed into funnels which bend as the funnels narrow towards the other tank of the pair, becoming horizontal pipes as the funnels pass over or under the wall of the tanks 1A, 1B to which each is attached. The horizontal ends of the bottom two fittings are connected by a section of steel pipe 6A which tapers smoothly from its ends to a narrower, constant diameter segment in its middle. The steel fitting 5B coupled to the first tank 1A, the steel pipe 6A and the steel fitting 5D form a first piping system 102 that connects a first end 104 of the first tank 1A to a first end 106 of the second tank 1B. The steel fitting 5A coupled to the first tank 1A, the steel pipe 6B and the steel fitting 5C form a second piping system 108 that connects a second end 110 of the first tank 1A to a second end 112 of the second tank 1B. The first tank 1A, the first piping system 102, the second tank 1B and the second piping system 108 may form a circular path for the air to circulate through the first regenerative heat exchangers 130 and the second regenerative heat exchanger 132. The top horizontal ends of the fittings 5A and 5C are attached to a radiator-type heat exchanger 7, which may be used to cool the air passing through it. The radiator-type heat exchanger 7 may be provided in the second piping system 108. Alternatively, the radiator-type heat exchanger 7 or an additional radiator-type heat exchanger may be provided in the first piping system 102. The external surface of the module 100 may be covered with a layer 8 of a thermally insulating material such as polyurethane foam, which in turn is covered by a waterproof membrane 9. The concrete or other pipe sections of the tanks 1A and 1B, thermally insulating material 8 and the waterproof membrane 9 each may form a flow-inhibiting layer inhibiting the flow of air, heat and/or water through the external surface of the module 100. A pressure relief valve 10 is included in the top steel fitting 5A for safety. A nozzle 11 passes through the wall of the bottom steel fitting 5B, ending at the beginning of the tapered pipe 6A and pointing down its central axis, as indicated in FIG. 1.

The outer diameter of the tanks 1A and 1B may be about 4 feet. The tanks 1A and 1B may be situated about 7 feet apart. As will be seen in subsequent drawings, the lengths of tanks 1A and 1B may be about 16 feet. The steel fittings 5A-5D may end as horizontal pipes having about 1 foot in diameter, and be about 4 feet in height. The layer of thermal insulation 8 may be about 6 inches thick. One of ordinary skill in the art will appreciate that the dimensions provided herein are for illustration purposes only and may be varied considerably in other embodiments without deviating significantly from the intent of the present invention.

In its discharged state, the zeolite particulate 2 is at a temperature near the boiling point of water, while the inert particulate 3 is at a deep-freeze temperature of order −20° F. The pressure of the air in the module will be of order 10 atmospheres gauge.

In order to charge the module 100 with energy in the form of compressed and adsorbed air, hot air from a compressor (not illustrated herein) is directed into the nozzle 11 beneath the zeolite-filled tank, i.e. the first tank 1A. The air 120 escaping the nozzle 11 entrains the surrounding air and carries the surrounding air down the doubly tapered steel pipe 6, forming a device known as an ejector 124 or shock-wave compressor. In the exemplary embodiment illustrated in FIG. 1, the air 120 introduced through the nozzle 11 may circulate in a counter-clockwise direction while charging the module 100. As the air 120 emerges from the pipe 6A into the steel fitting 5D at the bottom of the second tank 1B filled with inert particulate 3, the speed of air drops and the pressure of air increases, so the steel fitting 5D acts as a diffuser. The pressure difference thus created across the inert-particulate-filled tank 1B causes the air to flow upwards through the inert particulate 3 bed, emerging from the top at the bed's initial cold temperature. From there the air passes through the heat exchanger 7 and, in order to make up for thermal losses, is further cooled by the passage of a cold mixture of water and antifreeze through the coils of the heat exchanger 7. The air then enters the zeolite particulate 2 bed, where a portion is adsorbed by the zeolite as the zeolite is cooled by the air, while the majority of the air passes through the zeolite particulate 2 bed, emerging from the bottom at the bed's initial hot temperature. The module 100 is designed so that the rate at which air enters the nozzle 11 is equal to the rate at which the air is adsorbed by the zeolite particulate 2 bed, resulting in a steady state wherein the pressure of the air in the module 100 remains essentially constant throughout the charging process.

It should be noted that the circulation of the air around the module 100 creates a positive feedback loop which will improve the entrainment ratio of the ejector 124 formed by the nozzle 11 and the doubly tapered steel pipe 6A. While air circulates around the module 100 in this fashion, a hot temperature front slowly passes upwards through the inert particulate 3 bed while a cold temperature front slowly passes downwards through the zeolite particulate 2 bed. The air exiting from the beds remains at the initial temperatures of the corresponding particulates throughout the charging process.

Once these thermal fronts start to break through the top of the inert particulate 3 and the bottom of the zeolite particulate 2 beds, the module 100 has been fully charged with energy and the flow of air through the nozzle 120 is turned off.

During the storage period, the temperatures of the zeolite particulate 2 and inert particulate 3 will decay gradually towards that of their surroundings. As the zeolite particulate 2 warms it may be necessary to bleed off some of the air as the air desorbs in order to keep the pressure from rising to unacceptable levels. In another embodiment (not shown), the temperature of the zeolite bed 2 could be kept at its initial value by slowly circulating air via a shunt which bypasses the hot inert particulate 3 bed while continuing to cool the air as it passes through the heat exchanger 7. This would require the input of additional energy during the storage period, but as long as the storage period is not too long and the regenerators 130 and 132 are thermally well-insulated, this parasitic load would not be significant. The loss of heat from inert particulate 3 bed during the storage period is not as great of a concern as this will not require any air to be released.

In the charged state, the zeolite particulate 2 is at a deep-freeze temperature while the inert particulate 3 is near the boiling point of water. The pressure of the air in the module 100 is again of order 10 atmospheres gauge. In order to discharge the stored energy, air 122 is sucked into the nozzle 11 beneath the zeolite-particulate-filled tank 1A. This causes the air in the doubly tapered steel pipe 6A to flow towards the nozzle 11, lowering the pressure in the steel fitting 5D beneath the inert-particulate-filled tank 1B. The majority of air flowing through the tapered pipe 6A does not enter the nozzle 11 but flows past the nozzle 11, raising the pressure in the steel fitting 5B beneath the zeolite-particulate-filled tank 1A. The pressure differences thus created across the tanks causes air to flow through the particulate beds filling them, in the downwards direction for the inert bed 3 and in the upwards direction for the zeolite bed 2, i.e the air flows clockwise in the embodiment illustrated in FIG. 1. Note the direction of the flow of the air, i.e. clockwise, is the opposite of the direction of the flow of the air while charging the module, i.e. counter-clockwise, so the particulate beds will function as efficient countercurrent regenerators for thermal energy storage and recovery.

As in the charging process, feedback from the already moving air will enhance the effectiveness of the suction pump, and well-defined thermal fronts will propagate slowly through the particulate beds throughout the discharging process. Thus the air coming out the bottom of the inert particulate 3 bed will have been heated to the particulate's initial near-boiling temperature, and will carry the its heat to the zeolite particulate 2 thereby raising its temperature. Similarly, the cold air coming out the top of the zeolite particulate 2 bed will cool the inert particulate 3. While it is possible to further cool the air as it passes through the heat exchanger 7, this will not be necessary providing that sufficient cold was added to the module 100 during the charging process and the storage period was not too long.

As the zeolite particulate 2 is heated to near-boiling, it releases most of the air it had adsorbed. The newly desorbed air is entrained by the air flowing upwards through the zeolite particulate 2 bed, but is not re-adsorbed as it flows through the bed because the cold zeolite higher up in the bed is already saturated with air. The air is then heated as it passes through the inert particulate 3 bed and emerges from the inert particulate 3 at that bed's initial temperature. The module 100 is designed so that the rate at which air is desorbed is equal to the rate at which the air 122 is sucked out of the module 100 by the nozzle 11, so the pressure remains essentially constant throughout the discharging process. Once the thermal fronts start to break through the ends of the tanks 1A and 1B, the module 100 has been fully discharged and the suction of air 122 into the nozzle 11 is stopped.

During the quiescent period between discharging and recharging, the temperatures of the zeolite 2 and inert 3 particulate beds will decay slowly back towards the temperature of their surroundings. If those losses exceed the amounts of heat and cold that can be added back during the charging process, this will decrease the amount of energy that the module 100 will store once the module 100 is fully charged, but it will not result in any net loss of efficiency in the recovery of the energy that the module 100 stores. This is in contrast to the effect of thermal losses during the quiescent period between charging and discharging the module 100, which will result primarily in a loss of efficiency especially if air needs to be released to keep the pressure within the limits of the module 100.

It will be apparent from the foregoing discussion that the essential features that must be designed into the module 100 are, first, that the effective porosity and tortuosity of the particulate beds and the rate of air flow through them cause the air to reach the temperature of the surrounding particulate before it has time to pass very far through the bed. This will ensure that the thermal fronts are narrow compared to the lengths of the tanks 1A and 1B, so that the air emerges at the initial temperatures of the particulates within them throughout the charging and discharging processes. Second, the rate at which the air 120 enters the module 100 through the nozzle 11 during the charging process, and the rate at which the air 122 exits the module 100 through the nozzle 11 during the discharging process, must match the rate at which the air is adsorbed and desorbed, respectively, as the thermal fronts propagate through the zeolite 2 bed, so that the pressure in the module stays approximately constant during these processes. The task of designing the module 100 to operate in this fashion may be accomplished by one skilled in the art of computational fluid dynamics and in the modeling of coupled heat and mass transfer in mixed-gas flows through packed bed reactors, with the aid of well-established methods embodied in commercially available software.

Also as previously noted, the cold lost during the period between discharging and recharging, as well as possibly the cold lost during the period between charging and recharging, can be made up for by cooling the air as it flows through the radiator-type heat exchanger 7 during the charging and discharging processes, respectively. In contrast, heat lost during the period between discharging and recharging, as well as heat lost during the period between charging and discharging, can only be added back to the module 100 via the air 120 coming out of the nozzle 11 during the charging process. Heat may not be added to module 100 of the preferred embodiment during the discharging process, although heat may be added to the air after the air 122 has left the module 100 via the nozzle 11, thereby compensating for heat and cold lost during the period between charging and discharging and improving the efficiency of the storage cycle. The module 100 of the preferred embodiment nevertheless has the advantage of needing only a single radiator-type heat exchanger 7 and having a simple geometry, both of which will help to keep its cost down.

Figure 2:
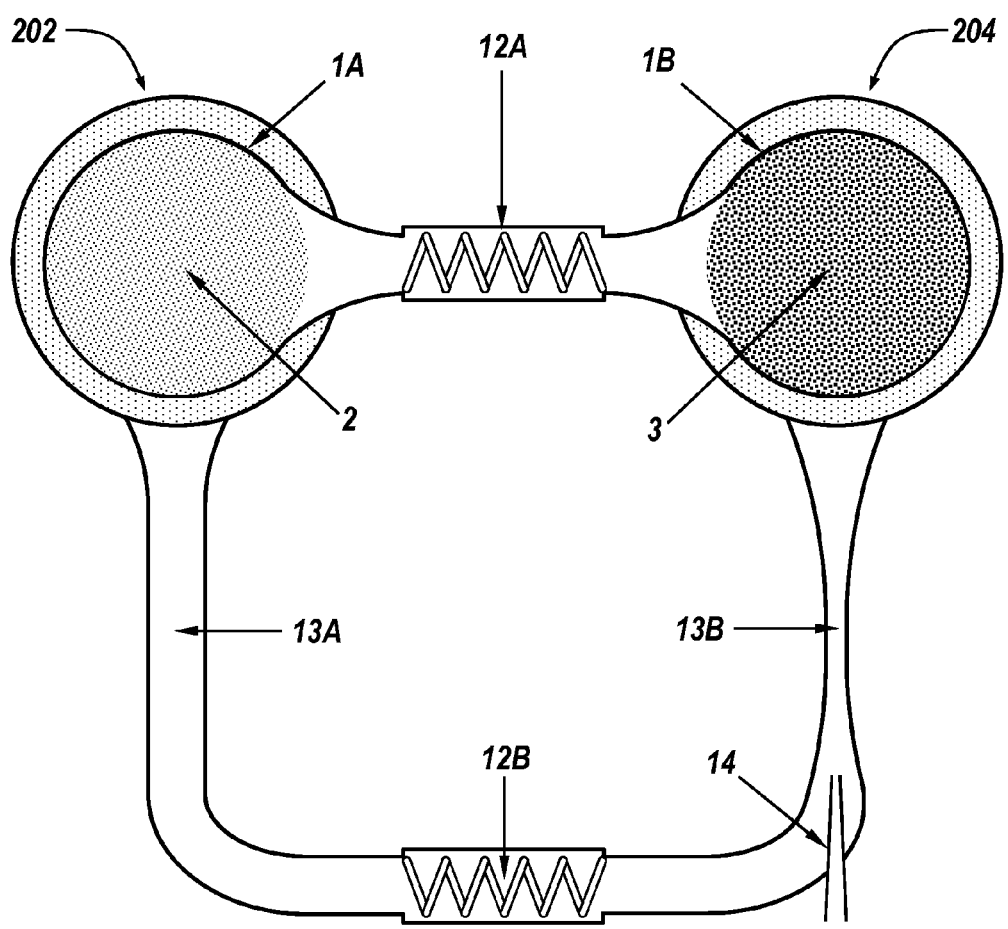
FIG. 2 is a schematic diagram of the air storage module of an alternative embodiment in which the air in the module can be heated as well as cooled.
Figure 3:
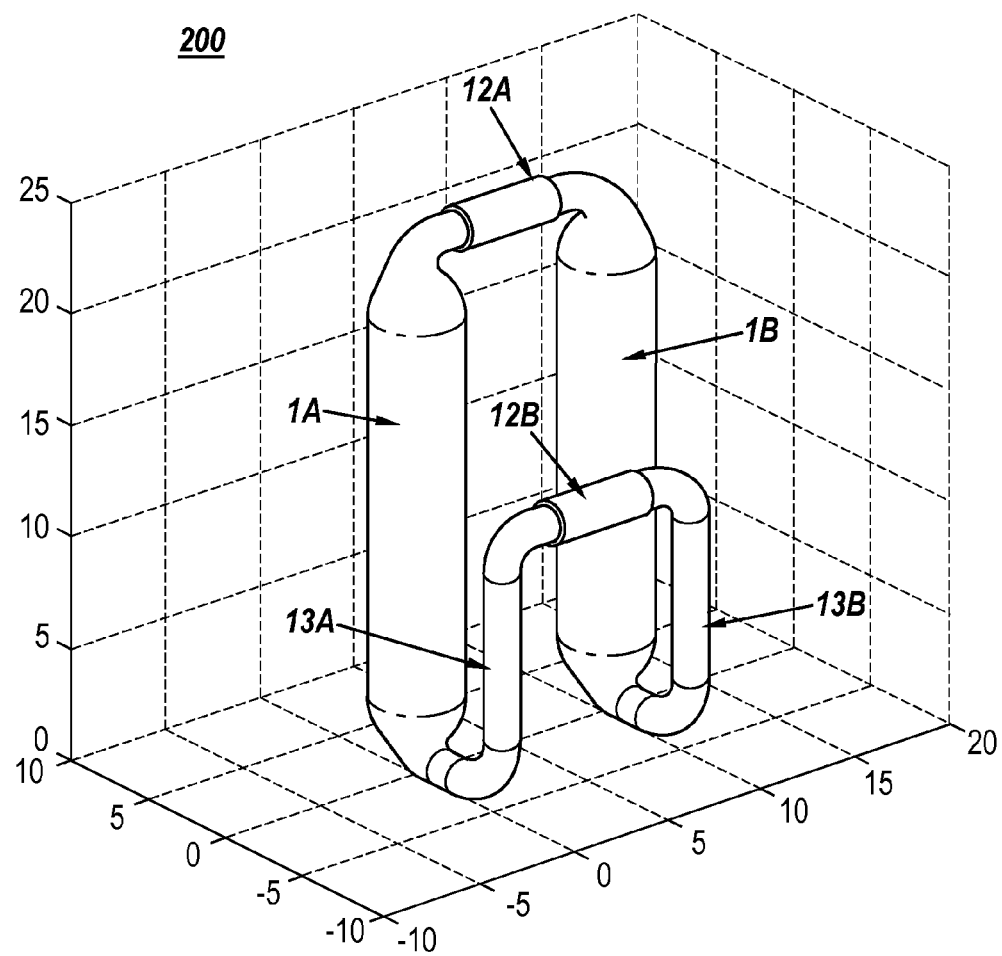
FIG. 3 illustrates how the components of the module diagrammed in FIG. 2 could be arranged in space.

FIG. 2 is diagrams the module in an alternative embodiment, while FIG. 3 shows how the parts thereof shown abstractly in FIG. 2. could be arranged in space. This alternative permits both heat as well as cold to be added to the appropriate particulate beds within it during either the charging or the discharging process. It does this by using two different radiator-type heat exchangers 12A and 12B, where heat exchanger 12B is located midway in height between the zeolite 2 and inert 3 particulate-filled tanks 1A and 1B.

The fittings at the bottom ends of the tanks 1A and 1B are connected to the heat exchanger 12B by two vertical steel pipe sections 13A and 13B. The nozzle 14 in the vertical steel pipe section 13B blows out or sucks in the air during the charging or discharging processes respectively, in order to circulate the air through the module 200 in opposite directions while charging or discharging the module 200 with energy. The heat exchanger 12A can be used to cool the air passing through it both while charging and discharging the module 200, making up for lost cold during the quiescent periods just as could be done with heat exchanger 7 in the module 100 illustrated in FIG. 1. The heat exchanger 12B can be used to heat the air passing therethrough both while charging and discharging the module 200, making up for lost heat during the quiescent periods, as the module 100 of FIG. 1 may not be able to do.

The use of two heat exchangers in the module 200 is necessitated by three requirements on how the module 200 operates. The first is that the air flow directions through the zeolite 2 and inert 3 particulate beds during the discharging process be the opposite of those during the charging process. This is because regenerative heat exchangers 202 and 204 are most efficient when operated in such a countercurrent fashion. The second is that the hot compressed air entering the module 200 during charging must first be cooled by passage through the inert particulate 3 bed, so that the heat of compression is deposited in the inert particulate 3 bed along with the heat stored by the zeolite particulate 2 and the heat of adsorption of the air by the zeolite particulate 2. The third is that the air exiting the module 200 during the discharge process must first have been heated by passage through the inert particulate 3 bed, so as to ensure that the heat of compression is recovered along with the air itself. Because the module 200 uses the same nozzle 14 both while charging and discharging the module 200, the heat exchanger 12B may not be used to make up for losses in the heat of compression, although that lost heat could be added back to the air after the air has exited the module 200 but prior to expansion.

The foregoing material shows how the compressed air energy storage module, for example module 100 of FIG. 1, can be charged and discharged once a substantial temperature difference has been created between the two particulate beds. The process by which this temperature difference is first created, starting from a state in which both the zeolite and the inert particulate beds are at the same ambient temperature, is substantially the same. One simply pumps hot compressed air into the module through the nozzle, while also cooling the air coming out of the inert particulate bed with the heat exchanger, until the corresponding thermal fronts break through the ends of their respective beds. One then discharges the relatively small amount of energy that has been stored, given that the zeolite particulate will not have cooled as much as desired, and repeats this process until a steady-state cycle is attained. At that point the zeolite particulate in the charged state will have been cooled as much as possible, given the temperature of the antifreeze-water mixture passing through the heat exchanger, while the temperature of the inert particulate will be close to the temperature of the incoming air while the module is being charged.

The final operation which the module must perform is to dry the zeolite. This is because zeolite adsorbs water more strongly than it does nitrogen and oxygen from air, and the adsorbed water blocks the adsorption of these air molecules. Although the zeolite should be dried before being put into the module, significant amounts of water may be adsorbed before the module can be sealed. The compressed air entering the module will also have been previously dried, but the trace amounts of water vapor remaining will gradually contaminate the zeolite over the course of thousands of charge-discharge cycles. For these reasons the module must be capable of drying the zeolite in situ.

Zeolite is most easily dried by heating it to about 300° F. and passing a dry gas through it to carry off the moisture as it desorbs. This can be done by using the heat exchanger to heat the air instead of cooling it, and repeatedly pressurizing and depressurizing the module to promote the flow of air through the heat exchanger and the zeolite bed, since little air will be adsorbed by the heated zeolite. A few hundred repetitions of this procedure would adequately dry the zeolite. Depending on circumstances, a less expensive option may be to place a resistive heating element directly in the zeolite bed itself, or to use the steel wires in the prestressed concrete pipe sections of the tank storing the zeolite particulate as the resistive heating element, while pressurizing and depressurizing the tank.

The zeolite used in the module of the preferred embodiment is variously known as 13X or NaX, which is known to adsorb significant quantities of the nitrogen, oxygen and argon constituents of air. Other zeolites such as 5A are also known to adsorb substantial quantities of air, and other kinds of adsorbents, such as mesoporous organosilicates or metal organic frameworks, with enhanced capacities for air and other favorable properties may be developed over time. Most zeolites including 13X adsorb nitrogen more strongly than oxygen or argon, and hence the air circulating in the gas flow loop will be enriched with these latter two gases while the system is being charged with energy. Just as nitrogen is preferentially removed from the external air being added to the system while charging the system, the larger quantities of nitrogen in the adsorbent will cause that gas to come off at a higher rate while discharging the system. As a consequence, the air being expanded in order to recover the stored energy is expected to have approximately its normal composition of nitrogen, oxygen and argon, at least once the behavior of the system has reached a steady state over the course of many charge-discharge cycles.

Zeolites have heat capacities comparable to other minerals formed from elements with low atomic number, or about 750 J/kg/K, which corresponds to a volumetric heat capacity of approximately 1.8 kJ/L/K. To this must be added the latent heat of adsorption, which will be close to the value of 25 kJ/mole for nitrogen since air is 78% nitrogen and that gas is adsorbed preferentially. Assuming a working pressure of 10 bar and temperature swing between −40° C. to +100° C., about 4 moles of air will be adsorbed and released by each kilogram of 13X. Assuming that a packed bed of 13X pellets will be 50% filled with 13X, while the rest is either void space or the binder used to form the pellets, a density of 1.53 kg/L for pure 13X implies that 3 moles of air will be adsorbed by each liter of the bed. The binder is usually about 20% by weight of the pellets and consists of a clay or silica gel, which have heat capacities and densities similar to those of 13X. Assuming a temperature swing of 140K is utilized, these estimates yield an effective volumetric heat capacity for the bed of 0.7×1.8+3×25/140=2.87 kJ/L/K.

The economic advantage of using 13X or any other adsorbent for air stems primarily from a reduction in the volume and hence the cost of the pressure vessels. The less "dead" space there is in the pressure vessels, the greater this reduction will be. Assuming that a packed bed of 13X pellets will be 50% filled with 13X, the packed bed of 13X pellets is expected to have about 50% dead space. The volume of the inert material bed of the second regenerator will add to the dead space. The inert material 3 should be chosen to have the highest possible volumetric heat capacity, subject to cost considerations which preclude the use of metals. A recent review of the heat capacities of common minerals (Natural Resources Research, 13(2), 97-122, 2004), promising candidates include common minerals such as diaspore (3.60 kJ/L/K), fayalite (3.56 kJ/L/K) and the orthogneiss rocks (3.64 kJ/L/K). Assuming that the void space in the second regenerator is comparable to that in the zeolite bed, these values imply that the second regenerator need only be 80% the volume of the first, so the additional dead space burden of using it to store the heat and cold taken from the zeolite-filled regenerator should be acceptable. The use of prestressed concrete pipe will also help keep the cost down.

The module of the preferred embodiment and the alternative also presented above is but an example of the use of a regenerative heat exchanger for the storage and recovery of most of the heat and cold needed to implement the AE-CAES storage cycle. Other embodiments are possible and may be advantageous in certain circumstances. Nothing said above should be construed to indicate that such alternatives, many of which will be obvious to one skilled in the art of adsorption engineering and adsorption heat pumps, was to be excluded from the new use of regenerative heat exchangers in AE-CAES, as herein set forth.

Figure 4:
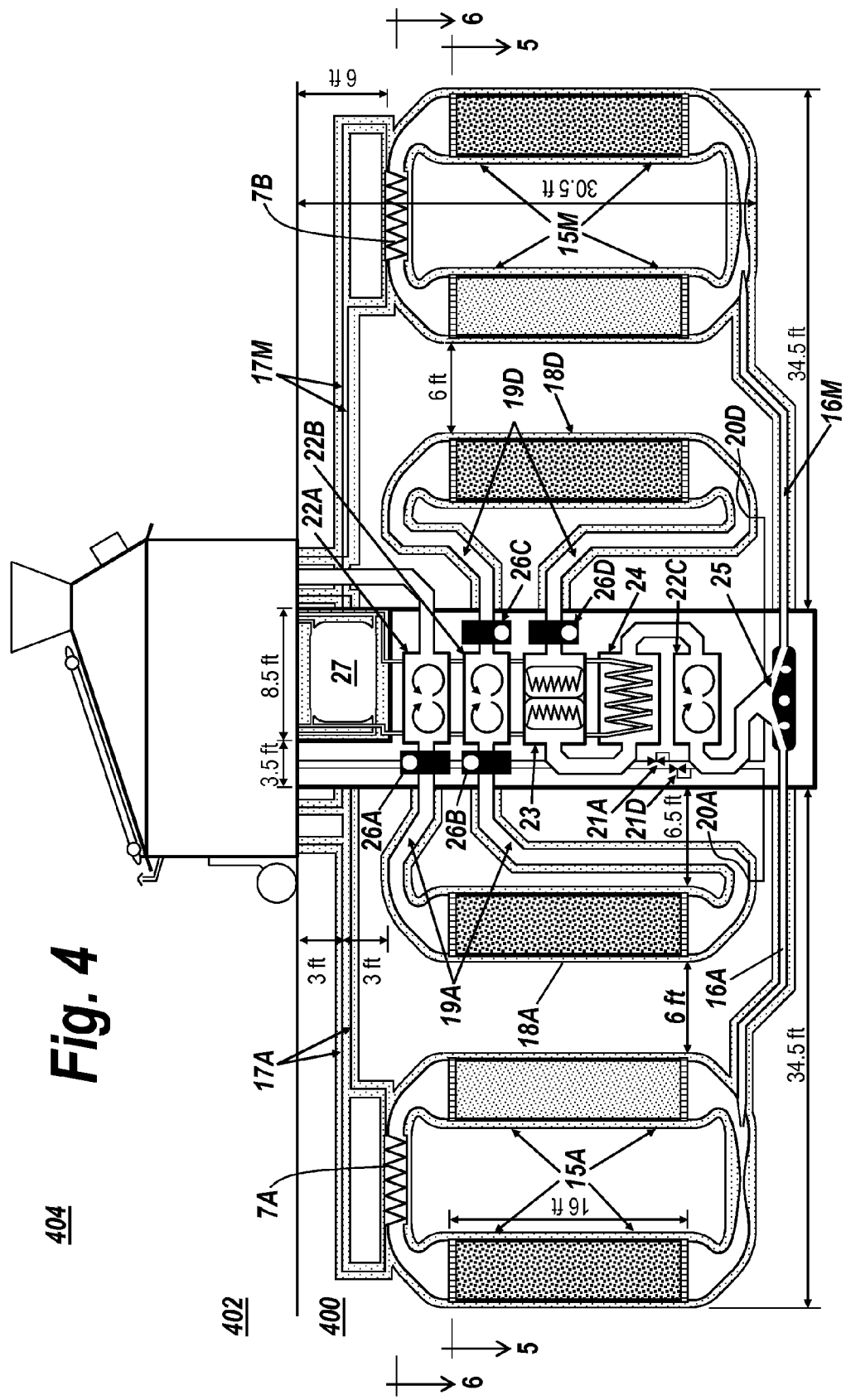
FIG. 4 shows a vertical cross-section of the underground portion of the AE-CAES system of the preferred embodiment.

FIG. 4 shows a vertical cross-section of the underground portion 400 of an exemplary AE-CAES system. Two buried compressed air energy storage modules, labeled 15A and 15M, may be seen on the far left and far right of FIG. 4. The nozzles in the bottom fittings of the compressed air energy storage modules 15A and 15M are connected to the underground portion 400 of a central equipment facility 404 using prestressed concrete pipes 16A and 16M through which the compressed air flows to and from the modules 15A and 15M. The prestressed concrete pipes 16A and 16M may be about 1 foot in diameter. The prestressed concrete pipes 16A and 16M pipes may surrounded by thermal insulation and a waterproof membrane like the concrete pipes of the modules 15A and 15M. The radiator-type heat exchangers 7A and 7M between the two top fittings are likewise connected to the aboveground portion 402 of the central equipment facility 404 by insulated pairs of pipes 17A and 17M, which carry the water-antifreeze mixture to and from the heat exchangers 7A and 7M. The pressure-relief valve in the modules 15A and 15M is connected to the aboveground portion 402 of the central facility 404 by tubing (not shown), so that the air can escape if need be without displacing the surrounding soil.

Two additional buried regenerators 18A and 18D, each consisting of insulated prestressed concrete pipe sections filled with an inert particulate, may also be seen on either side of the central equipment facility 404 in FIG. 4. The steel fittings on the top and bottom of these regenerators 18A and 18D are connected by pairs 19A and 19D of insulated prestressed concrete pipes 1 foot in diameter to the underground portion 400 of the central equipment facility 404, through which compressed air flows to and from the regenerators 18A and 18D. The purpose of the regenerators 18A and 18D is to store a portion of the heat of compression while charging the system with compressed air, and to return that heat to the air as the air is expanded in the course of discharging the system. A secondary purpose of the regenerators 18A and 18D is to trap the water that condenses as the compressed air is cooled during its passage through the regenerators 18A and 18D. This water will flow via drains 20A and 20D back to the underground portion 400 of the central facility 404, and then via the aboveground portion 402 to a sewer or other drainage system for disposal. The control valves 21A and 21D ensure that only water and not air is taken out of the regenerators 18A and 18D.

The modules and additional regenerators are constructed in-place by drilling pairs of caissons vertically into the ground, just as caissons are commonly drilled in the course of laying the foundations of buildings. Instead of filling these caissons with concrete as would be done for building foundations, they will be lined with the prestressed concrete pipe sections surrounded by thermal insulation covered with a waterproof membrane, and filled with either zeolite or the inert particulates, as previously described. Prior to doing that, the pair of caissons for each module may be connected by a two horizontal tunnels, for example about 2 feet in diameter, which may be constructed by horizontal drilling or ramjacking construction methods. The tunnel at the bottom may contain the doubly tapered steel pipe 6 and its surrounding insulation, while the other tunnel about 24 feet higher up the caissons may contain the radiator-type heat exchanger and its surrounding insulation.

Similar but longer horizontal tunnels may be drilled from the underground portion of the central facility to the closest caisson of each module, which will hold the zeolite-filled concrete pipe section, and to the caissons for the additional regenerators. These horizontal tunnels will likewise be lined with membranes, fitted with the prestressed concrete pipes such as 16A, 16M, 19A and 19D that will conduct compressed air to and from the regenerators, and filled in with thermal insulation such as polyurethane foam. The horizontal drilling techniques needed are well known to one of ordinary skill in the art of trenchless technology. The horizontal tunnels for the insulated pipes by which a water-antifreeze mixture is conducted to and from the heat exchangers of the modules may be relatively shallowly buried, and laid in surface trenches which are then filled in with soil.

The underground portion of the central facility seen in FIG. 4 may be constructed by conventional earthmoving equipment, and lined with a membrane and reinforced concrete in order to keep it open and dry. The underground portion of the central facility contains three air compressors 22A, 22B and 22C, which perform the first, second and third stages of compression, respectively. In the preferred embodiment these compressors are variable speed, oil-free, twin-screw compressors, which are commercially available and widely used for industrial pneumatics. Twin screw compressors have the advantage over most others of being able to also serve as expander-generators for recovery of the stored energy. Being oil-free ensures that the zeolite is not contaminated by oil, while being variable speed helps keep the efficiency high should the flow-rates vary during the charging and discharging processes. The compression ratio achieved by each compressor of the preferred embodiment is approximately 2.29, so that the three stages of compression utilized with attain a pressure of about $2.29^3 = 12$ atmospheres. Once the air reaches the module and a large portion of it has been cooled, this will result in a module pressure of approximately 10 atmospheres gauge in accord with earlier disclosures. These compressors will operate in a near-adiabatic fashion, thereby heating the air from ambient temperatures to nearly 220° F.

Following the first and second stages of compression, the air passes through the additional regenerators 18A and 18D, respectively, from top to bottom. This cools the air to ambient temperatures and takes out most of the moisture it contained when taken from the surroundings, as previously described. The remaining moisture is then removed by passing the air through a standard desiccant dryer 23. This is indicated in the drawing by a box containing a pair of vertical heat exchanger symbols, as such a pair of heat exchangers is employed in desiccant dryers to heat and so drive the water off one desiccant bed while the other is being used to cool a second desiccant bed while drying the air. In the preferred embodiment the desiccant is the same NaX zeolite that is used to adsorb air in the modules, which ensures that no moisture or other contaminants remain in the air that would affect the zeolite in the modules, the latter being harder to dry and much harder to replace than the zeolite in the dryer. The air from the dryer continues through a radiator-type heat exchanger 24 which warms it by 40 to 50° F., and is then subjected to the third stage of compression by the compressor 22C. Thus the air coming out of the third stage will be at about 265° F. and contains sufficient additional heat to compensate for losses in transport or during the quiescent period between charging and discharging. In the alternative embodiment discussed previously, heat losses would be compensated for within the modules shown in FIGS. 2 and 3, so the heat exchanger 24 may not be needed.

Figure 5:
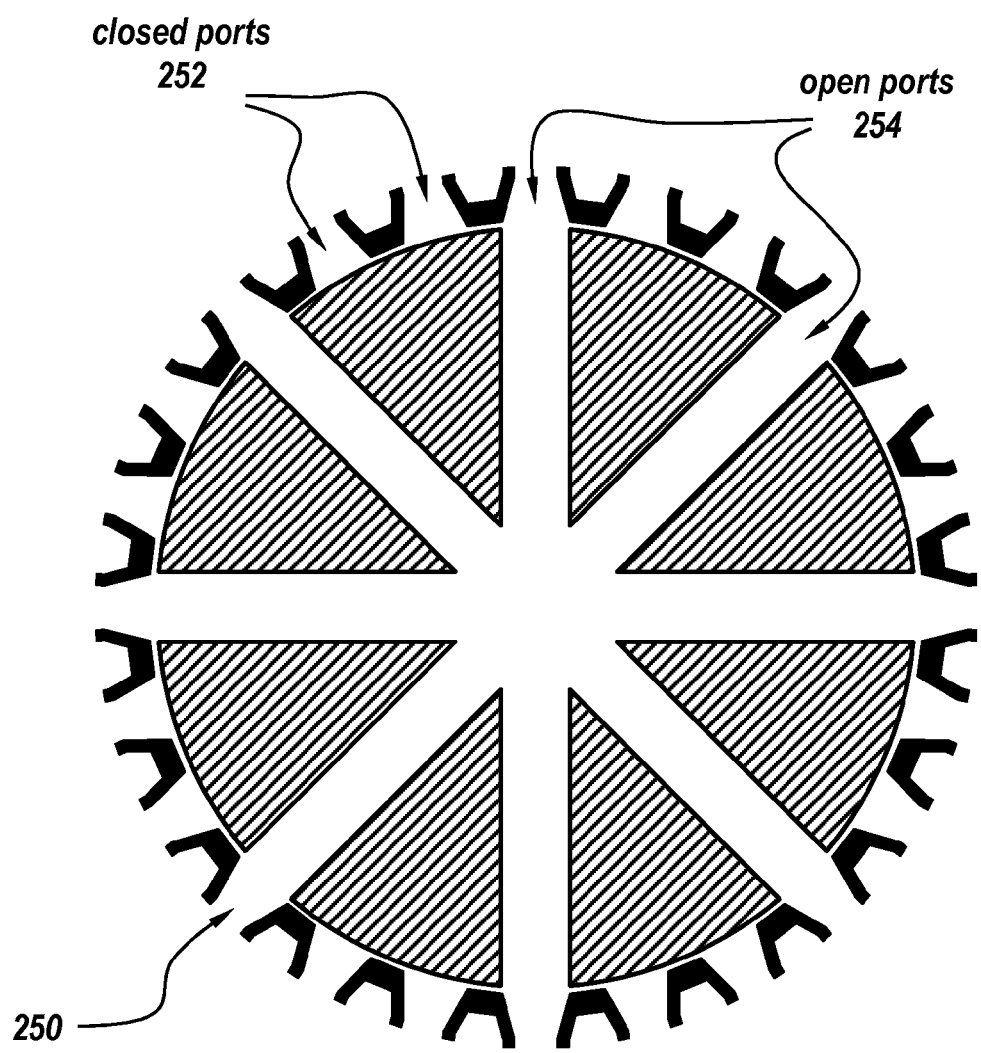
FIG. 5 is a cross-section of the multiway valve that controls which of the three groups of eight modules each is being charged or discharged.

Referring to FIG. 4, a multiway valve or switch 25 may be provided in the underground portion 400 of the central facility 404 to determine which of the surrounding modules will receive air from or deliver air to the central facility 404. An exemplary embodiment may include a total of twenty four modules, eight of which may receive air from or deliver air to the central facility at any one time. Thus the system as a whole may be charged and discharged in three stages, each involving eight of the twenty four modules. Accordingly, the cross-section of the multiway valve 25 shown in FIG. 5 contains twenty four ports 250, and directs the air through eight open ports 254 at a time. The multiway valve 25 has three settings controlling which eight ports are open ports 254 and the remaining ports will be closed ports 252. Similarly there are a total of six additional regenerators such as 18A and 18D in FIG. 4, only two of which are in use at any one time to store or restore the heat from the first two stages of compression. The corresponding 3-setting valves are labeled 26A, 26B, 26C and 26D in FIG. 4. The water reservoir 27 shown above the underground pit of the central facility 404 is used for thermal energy storage there, as will be described below.

Figure 6:
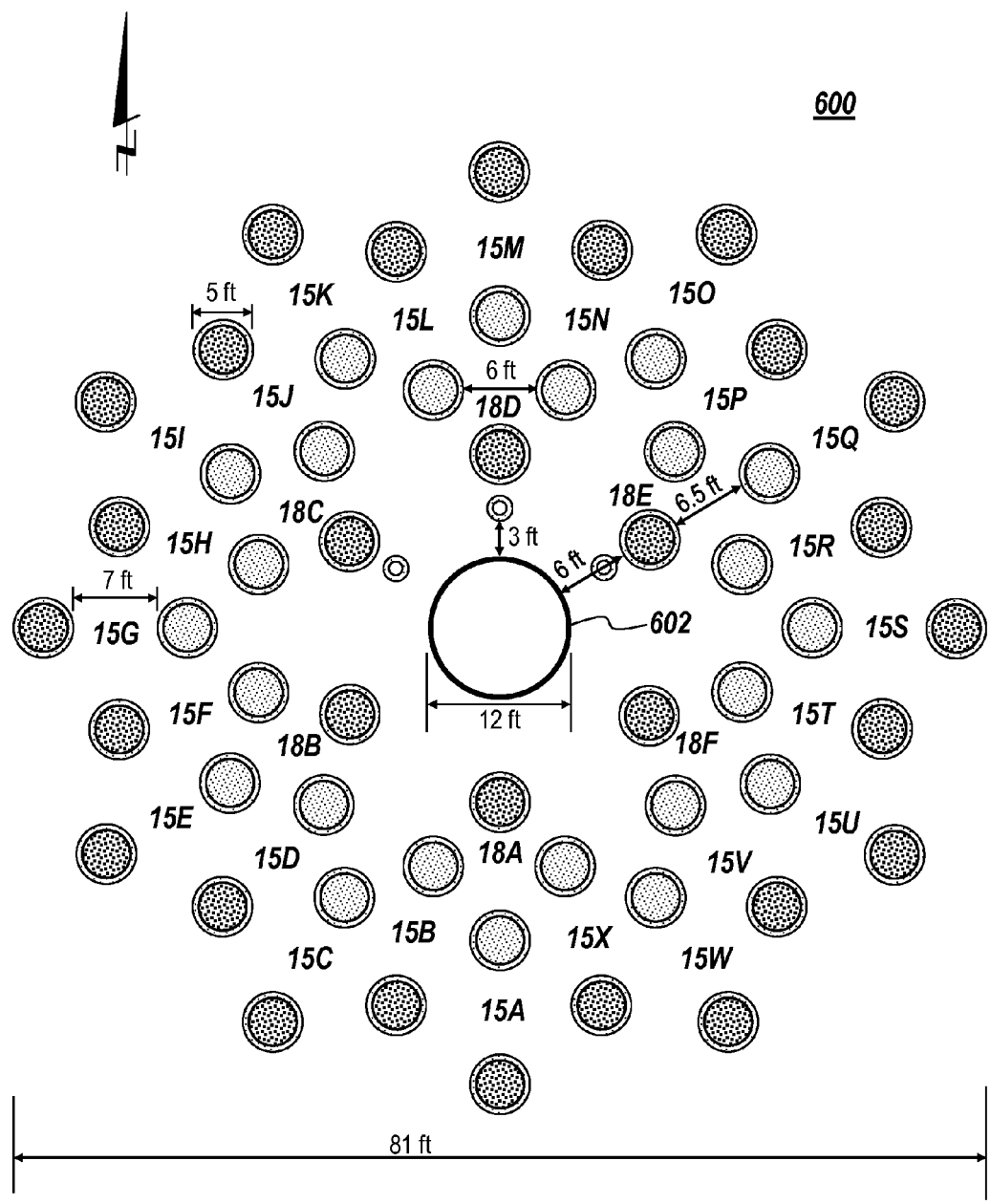
FIG. 6 is a horizontal cross section of the entire AE-CAES system at a depth of twelve feet.

FIG. 6 is a horizontal cross section of the AE-CAES system 600 at a depth of about twelve feet, which indicates how the twenty four modules 15A-15X and six additional regenerators 18A-18F are arranged about the central equipment facility 602. Also shown are the labels of all the visible modules and additional regenerators, together with some representative distances among these regenerators and other components of the system.

Figure 7:
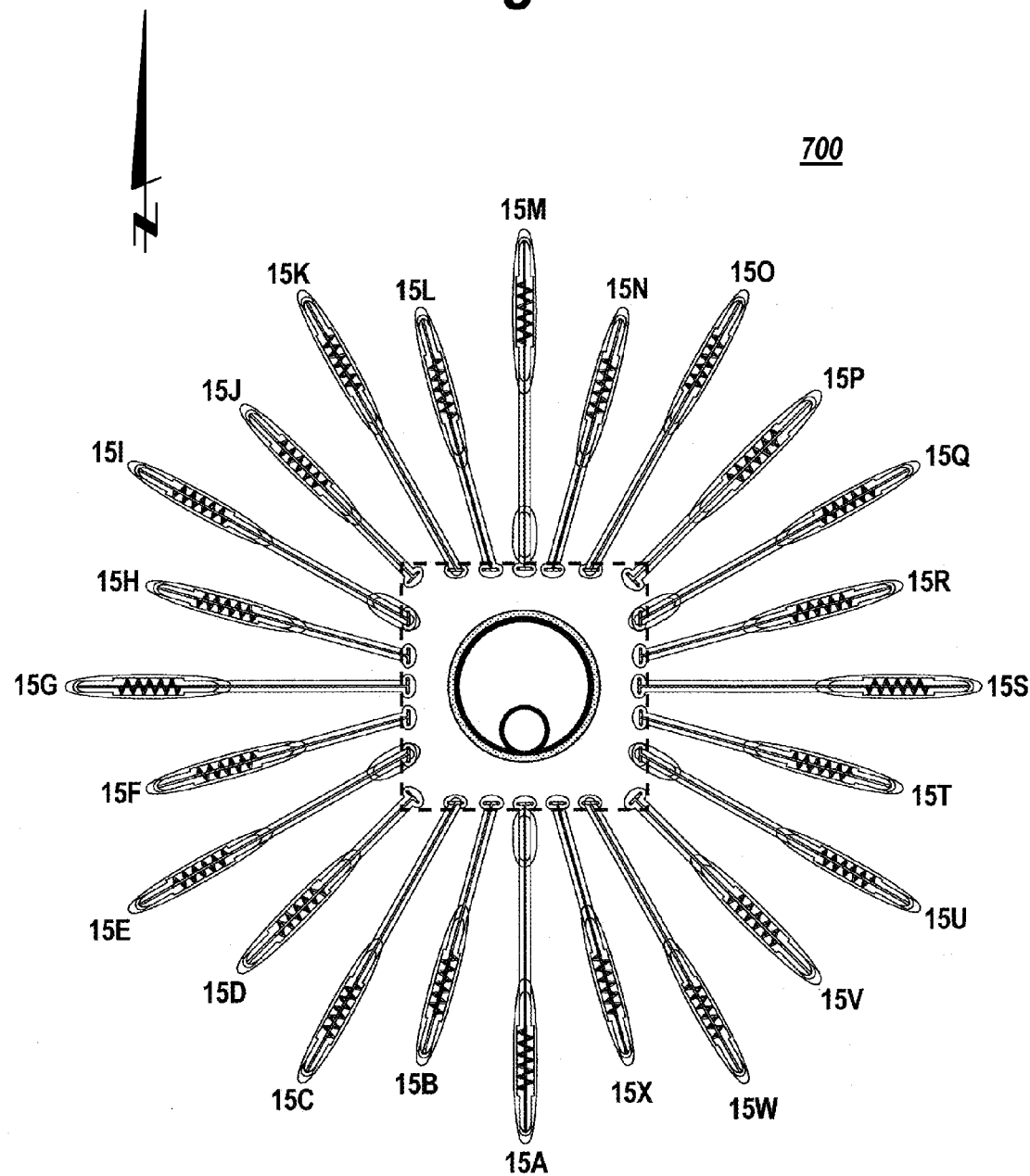
FIG. 7 is a horizontal section of the AE-CAES system showing all components between three and seven feet beneath the ground.

FIG. 7 is another horizontal section of the AE-CAES system 700, which shows all the parts between about three and seven feet in depth. This includes radiator-type heat exchangers of the individual modules and the pairs of insulated pipes by which the water-antifreeze mixture is conveyed to them. It may be seen that the modules occur alternately on two circles centered on the equipment facility, one with a radius of 40.5 feet and the other with a radius of 35 feet. This increases the spacing between the caissons drilled to contain them, and so helps keep the drilling operations from interfering with one another. The perimeter of the aboveground equipment shed is indicated with a dashed line, along with the walls of the water reservoir and the access port to the underground equipment pit, shown here on its south side.

Figure 8:
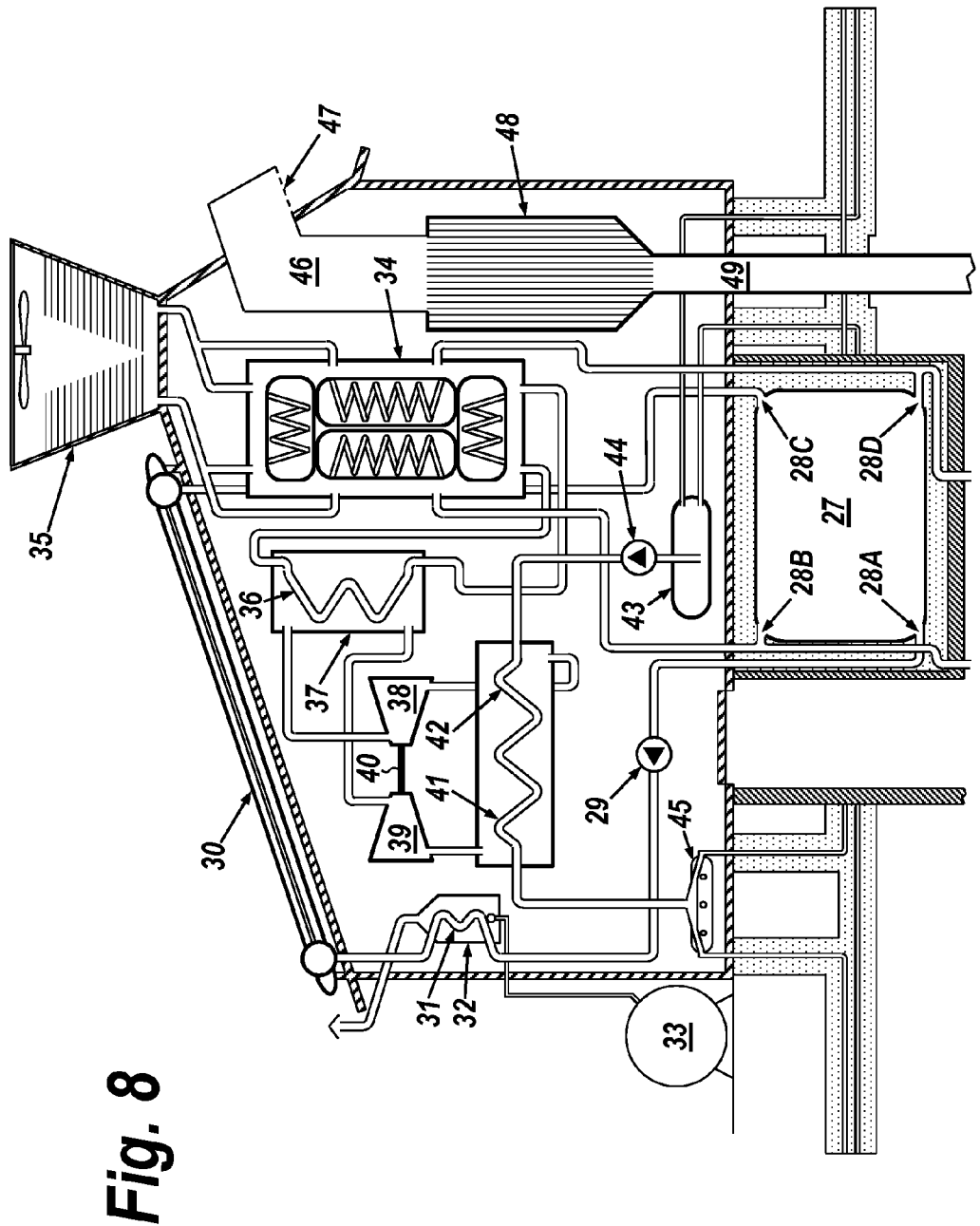
FIG. 8 is a largely schematic diagram of the equipment in or immediately under the shed, which houses the aboveground portion of the central facility.

FIG. 8 is a largely schematic diagram of the equipment in or immediately under the shed which houses the aboveground portion of the central facility in the preferred embodiment. The water reservoir 27 immediately under the shed stores hot water above its thermocline and cold water beneath it. Cold water from the outlet 28A is driven by the pump 29 to a solar thermal energy collector 30 on the roof, where the water is heated and returned to the reservoir 27 via hot water inlet 28C. The solar collector 30 is shown here on the south-facing roof, which is the most efficient direction in the northern hemisphere, whereas in the southern hemisphere a north-facing roof would be preferred. The cold water from the reservoir may also be heated as the cold water passes through the heat exchanger 31 within the furnace 32, which may be fueled by natural gas, propane from the tank 33 or, for complete carbon neutrality, by a biofuel such as ethanol. This ensures that hot water will always be available to the facility even on overcast days.

The hot water, which exits the outlet 28B and is returned to the reservoir 27 via the cold water inlet 28D, is used for two purposes. The first is to heat the air prior to the third stage of compression via the radiator-type heat exchanger 24, as previously described. The second is to power a standard commercial adsorption chiller 34, which is depicted symbolically in the drawing by a box with two vertical and two horizontal heat exchangers in the box. One of the vertical heat exchangers is used to dry a desiccant bed, consisting for example of silica gel, using hot water from the outlet 28B. The water vapor leaving this desiccant bed is condensed by the upper horizontal heat exchanger, which is cooled with water from the cooling tower 35. At the same time water from the cooling tower is also passed through the other vertical heat exchanger to carry heat away from a second desiccant bed as it adsorbs water from an evaporator, which houses the bottom horizontal heat exchanger. The warm water is sent to the cooling tower 35 to efficiently return it to ambient temperatures. Once the second desiccant bed is saturated with water, the roles of the two vertical heat exchangers are swapped, so that water vapor is continuously removed from the evaporator. The heat exchanger in this evaporator produces chilled water at about 40° F., ensuring that the central facility has continuous access to both hot and chilled water generated largely or entirely in a carbon neutral fashion.

The chilled water is not cold enough to bring the zeolite in the modules 15A-15X to the requisite deep-freeze temperatures, but instead serves as the heat sink for a second stage of refrigeration which achieves such temperatures. Such a low-temperature heat sink improves the coefficient of performance of the second stage and hence the amount of electric energy needed to power it. This is done by passing the chilled water through the heat exchanger 36 in the condenser 37 in order to condense ammonia vapor coming from the compressor 38. The condensate in turn drives the expander 39, which is coupled to the compressor by the shaft 40, as is commonly done in high-efficiency refrigerators. The cold ammonia condensate then passes through the evaporator 41, where it cools the water-antifreeze mixture passing in a countercurrent fashion through the heat exchanger 42 to the requisite deep-freeze temperature. The water-antifreeze mixture is draw from the holding tank 43 by the pump 44, and after cooling is directed by a second multiway valve 45 to the radiator-type heat exchangers 7 of the same eight modules that are currently receiving compressed air according to the setting of the first multiway valve (25 in FIGS. 4 & 5). The warmer water-antifreeze mixture then returns to the holding tank 43 as indicated in the drawing.

The remaining components of the central facility include a duct 46, which extends from the roof of the shed and ends in a downwards facing port covered by a screen 47. This ensures that rain will not enter with the ambient air as it is drawn in by the first-stage compressor (22A in FIG. 5) when charging the AE-CAES system with energy. The air passes through a filter 48 to remove dust that could degrade the performance of the equipment, and then flows via another duct 49 to the underground portion of the central equipment facility for compression, drying, heating and distribution to the modules, as previously described. While discharging the AE-CAES system, the air will be returned to the surroundings via these same ducts after being desorbed and expanded.

The volume of the zeolite and inert particulate beds in each regenerator of the preferred embodiment is about 200 cubic feet. The energy density estimates given in the prior art (U.S. Pat. No. 8,136,354) thus imply that the 24 modules together will store about 900 kilowatt-hours of energy. Each compressor 22A, 22B & 22C of the preferred embodiment is assumed to draw and be able to generate 50 kilowatts of electricity, for a total 150 kilowatts. Neglecting losses, this leads to the estimate that it will take 2 hours to charge or discharge each group of eight modules, so the entire AE-CAES system of the preferred embodiment will be able to provide power for about six hours before needing to be recharged. This is ideal for grid applications such as diurnal load leveling and renewable capacity firming.

Figure 9:
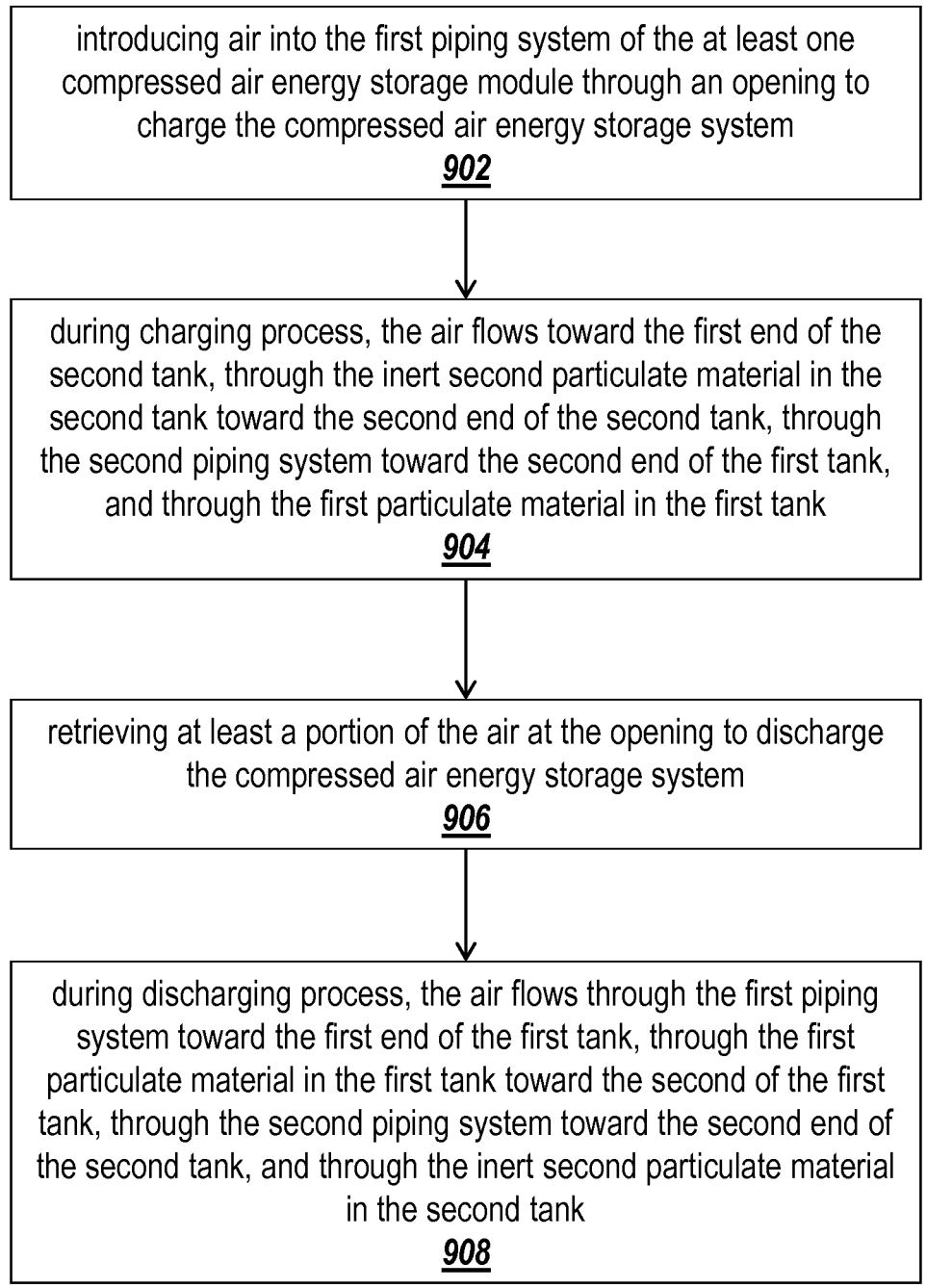
FIG. 9 is a flowchart illustrating the steps for charging and discharging a compressed air energy storage system comprising at least one compressed air energy storage module.

FIG. 9 is a flowchart illustrating the steps for charging and discharging a compressed air energy storage system comprising at least one compressed air energy storage module. The at least one compressed air energy storage module may include a first regenerative heat exchanger including a first tank filled with a first particulate material that stores thermal energy and adsorbs air, a second regenerative heat exchanger including a second tank filled with an inert second particulate material that stores thermal energy. A first end of the first tank is connected to a first end of the second tank via a first piping system. A second end of the first tank is connected to a second end of the second tank via a second piping system. The first piping system and the second piping system form a circular path for the air to circulate through the first and second regenerative heat exchangers. Given such a compressed air energy storage system, the air is introduced into the first piping system of the at least one compressed air energy storage module through an opening to charge the compressed air energy storage system (step 902). During the charging of the compressed air energy storage system, the air flows toward the first end of the second tank, through the inert second particulate material in the second tank toward the second end of the second tank, through the second piping system toward the second end of the first tank, and through the first particulate material in the second tank (step 904). At least a portion of the air is retrieved at the opening to discharge the compressed air energy storage system (step 906). During the discharging of the compressed air energy storage system, the air flows through the first piping system toward the first end of the first tank, through the first particulate material in the first tank toward the second of the first tank, through the second piping system toward the second end of the second tank, and through the inert second particulate material in the second tank (step 908).

Figure 10:
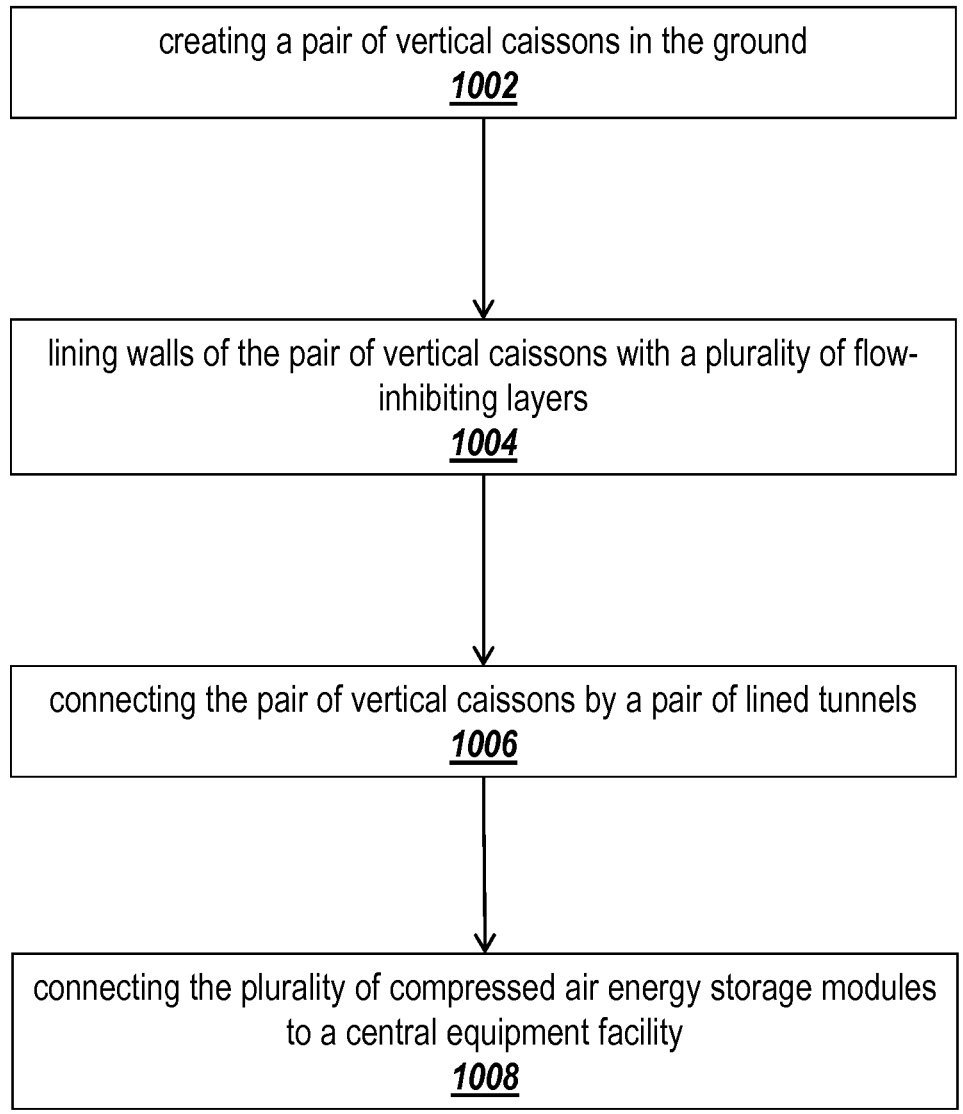
FIG. 10 is a flowchart illustrating the steps for building an exemplary compressed air energy storage system comprising a plurality of compressed air energy storage modules.

FIG. 10 is a flowchart illustrating the steps for building an exemplary compressed air energy storage system comprising a plurality of compressed air energy storage modules.

Each of the plurality of compressed air energy storage modules may include a first regenerative heat exchanger including a first tank filled with a first particulate material that stores thermal energy and adsorbs air, a second regenerative heat exchanger including a second tank filled with an inert second particulate material that stores thermal energy. A first end of the first tank is connected to a first end of the second tank via a first piping system. A second end of the first tank is connected to a second end of the second tank via a second piping system. The first piping system and the second piping system form a circular path for the air to circulate through the first and second regenerative heat exchangers. Each such compressed air energy storage module may be built by creating a pair of vertical caissons in the ground (step 1002). The walls of the pair of vertical caissons may be lined with a plurality of flow-inhibiting layers (step 1004). The flow-inhibiting layers may inhibit the flow of one or more of air, water and heat. The pair of vertical caissons may be connected by a pair of lined tunnels (step 1006). The plurality of compressed air energy storage modules may be connected to a central equipment facility (1008), such as one discussed above in connection with FIG. 4.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

No element, act, or instruction used in the description of the invention should be construed critical or essential to the invention unless explicitly described as such. It is intended that the invention not be limited to the particular embodiments disclosed above, but that the invention will include any and all particular embodiments and equivalents falling within the scope of the following appended claims.

The invention claimed is:

1. A compressed air energy storage module, comprising:
   a first regenerative heat exchanger including a first tank filled with a first particulate material that stores thermal energy and adsorbs air; and
   a second regenerative heat exchanger including a second tank filled with a second particulate material that stores thermal energy, wherein:
      a first end of the first tank is connected to a first end of the second tank via a first piping system,
      a second end of the first tank is connected to a second end of the second tank via a second piping system, and
      the first piping system and the second piping system form a circular path for the air to circulate through the first and second regenerative heat exchangers.

2. The energy storage module of claim 1, wherein the first tank and the second tank include a section of steel pipe, prestressed concrete pipe or a section of fiberglass composite pipe.

3. The energy storage module of claim 1, wherein the first particulate material includes one or more of a zeolite mineral, a mesoporous organosilicate, and a metal-organic framework.

4. The energy storage module of claim 1, wherein the second particulate material is an inert material including a metal or a mineral.

5. The energy storage module of claim 4, wherein the second particulate material includes one or more of a diaspore, fayalite or an orthogneiss rock.

6. The energy storage module of claim 1, further comprising:
   a radiator-type heat exchanger coupled to at least one of the first piping system and the second piping system such that the at least one of the first piping system and the second piping system passes through the radiator-type heat exchanger.

7. The energy storage module of claim 1, further comprising:
   a nozzle coupled to one of the first piping system or the second piping system for blowing air down the one of the first piping system or the second piping system, wherein the nozzle and the one of the first piping system or the second piping system form an ejector.

8. The energy storage module of claim 7, wherein the air is made to circulate by sucking the air into the nozzle from the one of the first piping system or the second piping system such that direction of a flow of the air is reversed from the direction of the flow of the air in the ejector.

9. A method for charging and discharging a compressed air energy storage system comprising at least one compressed air energy storage module, the at least one compressed air energy storage module including a first regenerative heat exchanger including a first tank filled with a first particulate material that stores thermal energy and adsorbs air, a second regenerative heat exchanger including a second tank filled with an inert second particulate material that stores thermal energy, wherein a first end of the first tank is connected to a first end of the second tank via a first piping system, a second end of the first tank is connected to a second end of the second tank via a second piping system, and the first piping system and the second piping system form a circular path for the air to circulate through the first and second regenerative heat exchangers, the method comprising:
   introducing air into the first piping system of the at least one compressed air energy storage module through an opening to charge the compressed air energy storage system, wherein:
      during charging process, the air flows toward the first end of the second tank, through the inert second particulate material in the second tank toward the second end of the second tank, through the second piping system toward the second end of the first tank, and through the first particulate material in the first tank; and
   retrieving at least a portion of the air at the opening to discharge the compressed air energy storage system, wherein:
      during discharging process, the air flows through the first piping system toward the first end of the first tank, through the first particulate material in the first tank toward the second of the first tank, through the second piping system toward the second end of the second tank, and through the inert second particulate material in the second tank.

10. The method of claim 9, wherein a hot temperature-front passes upwards through the second tank filled with the inert second particulate material while a cold temperature-front passes downwards through the first tank filled with the first particulate material.

* * * * *